(12) United States Patent
Horeth et al.

(10) Patent No.: US 10,743,463 B2
(45) Date of Patent: Aug. 18, 2020

(54) PUSH FROM BEHIND DROP SPREADER

(71) Applicant: CHAPIN MANUFACTURING, INC., Batavia, NY (US)

(72) Inventors: Edward J. Horeth, Rochester, NY (US); Randolf Charles Zingo, Rochester, NY (US)

(73) Assignee: Chapin Manufacturing, Inc., Batavia, NY (US)

( * ) Notice: Subject to any disclaimer, the term of this patent is extended or adjusted under 35 U.S.C. 154(b) by 0 days.

(21) Appl. No.: 15/628,389

(22) Filed: Jun. 20, 2017

(65) Prior Publication Data

US 2017/0359951 A1 Dec. 21, 2017

Related U.S. Application Data

(60) Provisional application No. 62/352,399, filed on Jun. 20, 2016.

(51) Int. Cl.
| | | |
|---|---|---|
| *A01C 15/00* | (2006.01) | |
| *A01C 15/02* | (2006.01) | |
| *A01C 17/00* | (2006.01) | |
| *A01C 19/04* | (2006.01) | |
| *B05B 3/10* | (2006.01) | |
| *E01H 10/00* | (2006.01) | |

(52) U.S. Cl.
CPC ............ *A01C 15/007* (2013.01); *A01C 15/02* (2013.01); *A01C 17/001* (2013.01); *A01C 19/04* (2013.01); *B05B 3/1007* (2013.01); *E01H 10/007* (2013.01)

(58) Field of Classification Search
CPC ..... A01C 15/007; A01C 15/02; A01C 17/001; A01C 19/04; B05B 3/1007; E01H 10/007

USPC ................ 239/668, 669, 681, 682, 685, 687
See application file for complete search history.

(56) References Cited

U.S. PATENT DOCUMENTS

| | | | | |
|---|---|---|---|---|
| 3,193,157 A | * | 7/1965 | Einhorn ................ | A01C 15/02 222/311 |
| 4,580,730 A | | 4/1986 | Amerine | |

(Continued)

OTHER PUBLICATIONS

Precision Products, Inc., Spreader, Model No. DS4500RDGY, http://precisionprodinc.com/details.php?model=DS4500RDGY, printed Jun. 14, 2016.

(Continued)

*Primary Examiner* — Jason J Boeckmann
(74) *Attorney, Agent, or Firm* — Woods Oviatt Gilman LLP; Katherine H. McGuire, Esq.

(57) ABSTRACT

A spreader having a hopper for particulate material with discharge openings over two separate different areas along the hopper bottom, a pair of wheels upon separate drive shafts mounted for rotation to a lower frame which supports the hopper, and a rear frame extending from the hopper to provide a pair of handles. Two rotatable shafts with agitator elements are mounted over each of the different hopper areas. Each of the agitator shafts are coupled for rotation by different ones of the drive shafts. Two gates with openings are disposed below the hopper each along different ones of the areas dividing the hopper bottom. Each gate is movable to close and open the openings of the hopper in the area associated with the gate. A pair of controllers are provided each coupled to a different one of the two gates to independently move the gates between open and close positions.

11 Claims, 11 Drawing Sheets

(56) References Cited

U.S. PATENT DOCUMENTS

| | | | |
|---|---|---|---|
| 4,671,434 A | 6/1987 | Johnston et al. | |
| 5,860,604 A * | 1/1999 | Kooiker | A01C 17/00 |
| | | | 239/670 |
| 7,380,734 B2 * | 6/2008 | Magnusson | A01C 17/008 |
| | | | 239/505 |
| 9,433,143 B2 * | 9/2016 | Sammons | A01C 15/02 |
| 9,657,451 B2 | 5/2017 | Delorme et al. | |

OTHER PUBLICATIONS

Meyer Products, Inc., Hotshot Commercial Drop Spreader Owner's Manual, Model No. 38191, printed Jun. 14, 2016.
Scotts Turf Builder Classic Drop Spreader, https://www.amazon.com/Scotts-Builder-Classic-Spreader-000-sq/dp/B002Ztk09u?ie=UTF8&tag=yardcaregurus-20, printed Jun. 16, 2016.
Meyer Products, Inc., Hotshot-100 Drop Spreader, https://www.meyerproducts.com/salt-spreaders/walk-behind/drop-spreader/hotshot-100, printed Jun. 14, 2016.
Lesco Drop Spreader, https://www.amazon.com/Lesco-Drop-Spreader-Was-031587/dp/BOOBJ5D3SQ?ie=UTF8&tag=yardcaregurus-20, printed Jun. 14, 2016.
Yard Care Gurus, Our Guide to Drop Spreaders, https://www.yardcaregurus.com/guide-to-drop-spreaders/, printed Jun. 14, 2016.
Buyers Products Company, SaltDogg WB400 Walk Behind Drop Salt Spreader, Assembly Instructions, printed Jun. 15, 2016.
Chapin International, Inc., Chapin Spreader Catalog, published Apr. 2016.
Chapin International, Inc., Chapin Salt Spreader Catalog, published Apr. 2016.

* cited by examiner

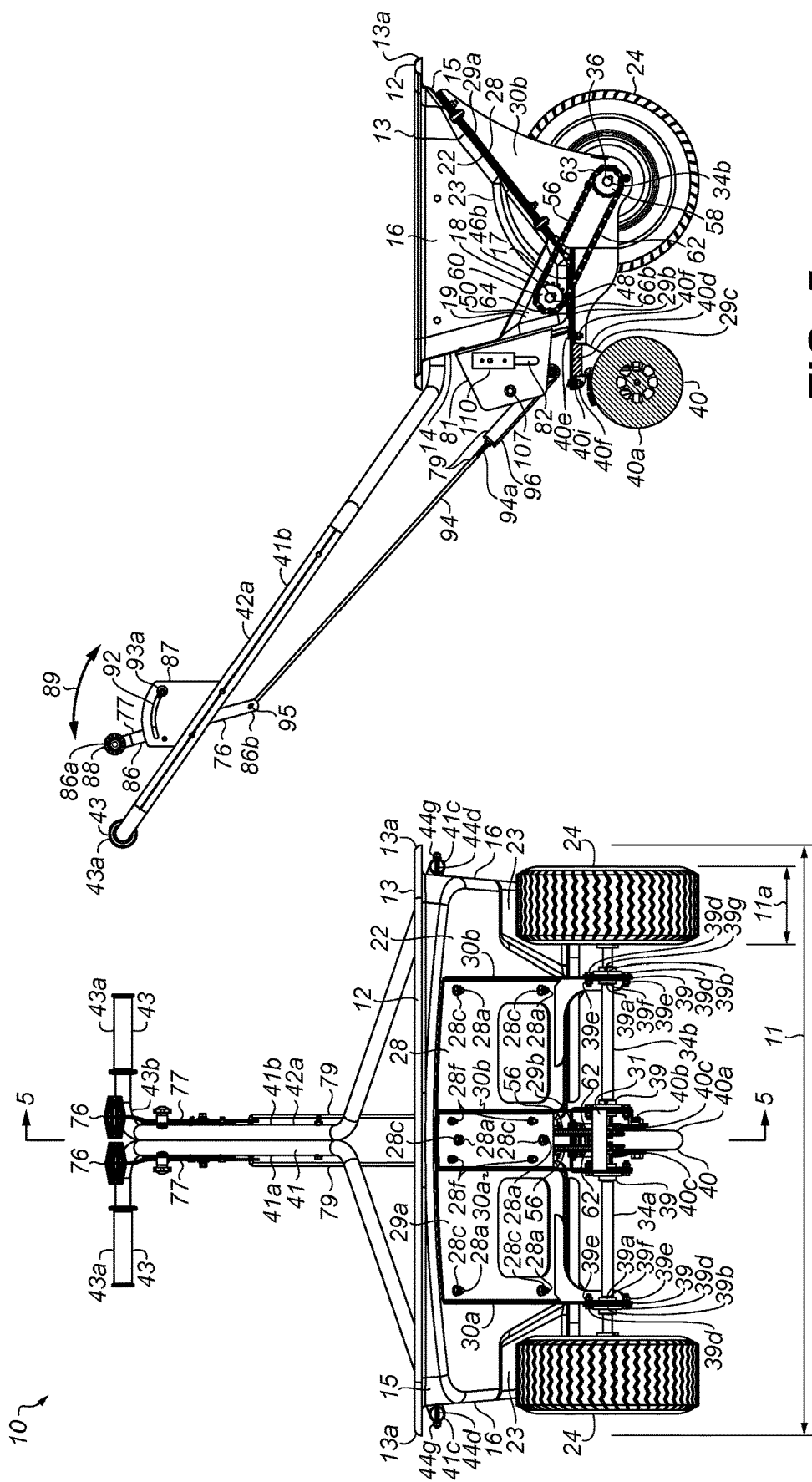

PUSH FROM BEHIND DROP SPREADER

This application claims priority to U.S. Provisional Application No. 62/352,399, filed Jun. 20, 2016, which is incorporated herein by reference.

FIELD OF THE INVENTION

The present invention relates to a push from behind drop spreader for particulate material, such as salt, ice melting material, sand, seed, fertilizer, or the like. The invention particularly relates to a drop spreader having a hopper for receiving particulate material, in which the entire width of the hopper, or operator selected right or left sides thereof, can be utilized to drop particulate material from discharge openings at the bottom of the hopper.

BACKGROUND OF THE INVENTION

Drop spreaders are manually pushed upon wheels along a surface, such as a ground, sidewalk, or roadway, and particulate material are dropped straight down through discharge openings in the bottom of a hopper of the spreader over a wide distance depending on the width of the hopper and discharge openings in the bottom thereof, so that the spreader only covers areas along the surface it crosses. A controller, sometimes called a bail controller, is positionable by the operator to open and close a flow gate below the hopper to start and stop dropping of particulate material through discharge openings of the hopper, so that the operator can control when particulate material are dropped while pushing the spreader along a surface.

Hoppers of conventional drop spreaders can be divided into two compartments with discharge openings along the bottom thereof, but have a single flow gate to open and close all of the discharge openings of the hopper. It has been found desirable to drop particulate material over less than the entire width of the spreader. However, despite having two compartments, the limitation of a single flow gate for the entire spreader makes it difficult to drop particulate material over only half the width of the spreader without placing particulate material in one compartment and not in the other.

Further, drop spreaders typically have rotatable particulate agitator elements, such as vanes, teeth, or horizontal augers, disposed upon a shaft that extends across the width of the hopper, even when the hopper in divided into left and right compartments. Such particulate agitator elements are used to improve flow of particulate elements from the hopper by breaking up clumps of particulate material. Conventional drop spreaders directly rotate such agitator elements using a drive shaft upon which the two wheels of the spreader are mounted. While useful, this requires that the two wheels of the spreader be disposed along the outside of the two opposing sides wall that define the width of the hopper so that the drive shaft for the wheels extends, via holes in such sides of the hopper, across entire width of the hopper. This increases the operational width needed for using the drop spreader beyond the width of the hopper to include the width of the wheels. If instead the wheels were positioned under the hopper of the spreader, then the drive shaft mounted to such wheels to directly rotate agitator elements cannot extend across the entire width dimension of the hopper. Thus it would be desirable to provide a drop spreader that can drop particulate material from the hopper's discharge openings substantially over the entire width dimension of the spreader that includes the width of the wheels, while providing wheel driven rotatable agitator elements that can extend to opposing side walls of the hopper. Moreover, direct drive by drive shaft wheels of the shaft along which agitator elements are mounted of conventionally drop spreaders often requires that the base of the hopper be lower to the ground, i.e., between the drive shaft and the surface over which the spreader travels, than often is desirable especially when needing to maneuver the hopper around snow banks in the case of dropping salt particulates.

SUMMARY OF THE INVENTION

Accordingly, it is an object of the present invention to provide an improved push from behind drop spreader that can drop particulate material from the discharge openings of the spreader's hopper substantially over the entire width dimension of the spreader including the wheels thereof.

Another object of the present invention is to provide an improved push from behind drop spreader having two separate drive shafts for each of the two wheels below the hopper of the spreader.

A further object of the present invention is to provide an improved push from behind drop spreader having independent rotating left and right shafts with agitator elements disposed over left and right areas of the hopper that divide the bottom of the hopper, where each of such left and right shafts is indirectly coupled to drive shafts of left and right wheels, respectively, such as by a drive chain and gears.

Still another object of the present invention is to provide an improved push from behind drop spreader having independent controllers for positioning left and right gates between open and closed positions to control flow from discharge openings in left and right areas dividing the bottom of the hopper.

Briefly described, the present invention embodies a spreader having a hopper for particulate material with discharge openings along the bottom thereof, in which such openings are divided along two separate different areas of the hopper, a lower frame supporting the hopper, a pair of wheels disposed under the hopper upon separate drive shafts mounted to the lower frame for rotating the wheels, a rear frame extending from the hopper upwards at an angle to provide a pair of handles for pushing the spreader along a surface with rotation of the wheels, and two rotatable shafts mounted in the hopper each over a different one of such two different areas and coupled for rotation to a different one of the two drive shafts, in which agitator elements for particulate material are provided along the shafts mounted in the hopper. Two gates with openings disposed below the hopper each along different ones of the divided areas of the hopper. Each gate is movable to close and open the openings of the hopper in the area associated with the gate. A pair of controllers are provided along the rear frame near the handles are each coupled to a different one of the two gates to independently move the gates between open and close positions.

The discharge openings of the hopper extend substantially over the entire width dimension of the spreader including the wheels thereof, so that when both left and right gates are in open positions, particulate material from the hopper's discharge openings fall onto the surface there below over (or substantially over) the entire width dimension of the spreader, i.e., onto the surface below the spreader over which the wheels travel.

The discharge openings in the hopper may be divided into their two different areas by a raised central portion of the hopper, where each of the areas extends from the raised central portion to one of two different opposing sides of the hopper. The shafts upon which agitator elements are mounted in the hopper are each mounted for rotation from such central raised portion of the hopper to one of the different opposing side walls of the hopper. Preferably, each of the rotatable shafts in the hopper has two ends, one of such ends being mounted for rotation along one of the two different opposing sides of the hopper, and the other of such ends being mounted for rotation in the raised central portion and then extending into a cavity formed by the raised central portion under the bottom of the hopper for coupling an upper gear, via a drive chain, to a lower gear coupled to one of the two drive shafts for the wheels. Thus rotation of each of the wheels in indirectly mechanically coupled to its associated shaft in the hopper along which agitator elements extend. The central raised portion preferably extends less than the entire height dimension of the hopper.

The spreader may further have a rear wheel supported by the lower frame. The two wheels then disposed in front of the rear wheel may then be referred to as the front wheels of the spreader. The rear wheel preferably swivels 360 degrees, and with the front wheels can support the weight of the spreader and any particulate material in hopper along the surface over which the spreader travels as an operator pushes the spreader. Preferably when the three wheels are on a surface, hopper is disposed on a slight backwards tilt, so that the operator may operate the spreader in a first mode by pushing the spreader by its handles along a surface upon the front and rear wheels, or in a second mode by pushing the spreader by its handles while lifting the rear frame of the spreader to a substantially horizontally level the hopper so that only the front wheels, and not the third wheel, contacts the surface over which the spreader travels. The third wheel being centrally located under the rear of the hopper also provides the dual function of a rear support member for the spreader when the spreader rests upon the surface, and supports part of the weight to the spreader in its first mode of operation to facilitate the operator in pushing the spreader along a surface.

BRIEF DESCRIPTION OF THE DRAWINGS

The foregoing and other objects, features and advantages of the invention will become more apparent from a reading of the following description in connection with the accompanying drawings in which:

FIG. 4 is a front view of the spreader of FIG. 1;

FIG. 5 is a cross-sectional view taken along line 5-5 of FIG. 4 in the direction of arrows at the end of such line;

DETAILED DESCRIPTION OF THE INVENTION

Figure 1:
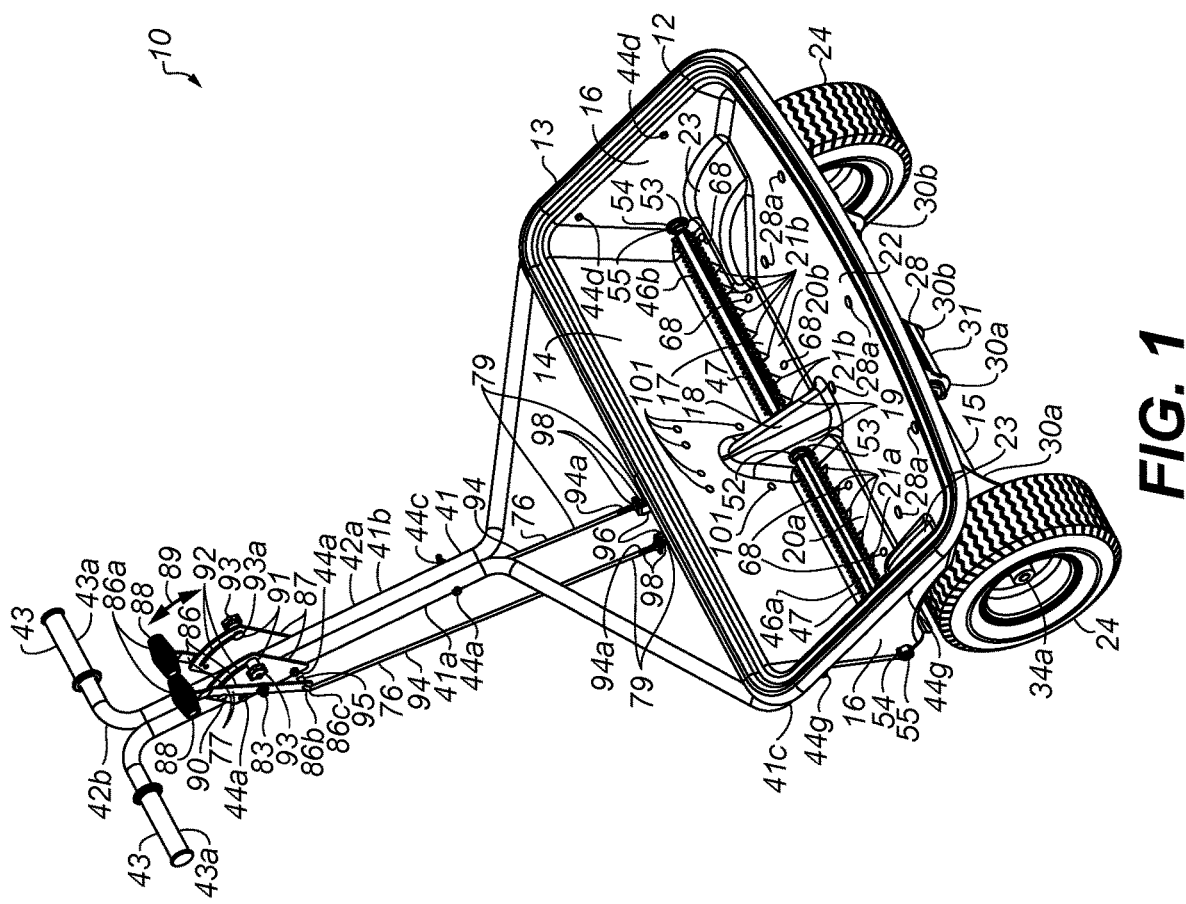
FIG. 1 is a perspective view of the drop spreader of the present invention taken from the top thereof.

Referring to FIGS. 1-9, a push from behind drop spreader 10 is shown having a hopper 12 with an open top end 13, a back wall 14, a front wall 15, two opposing side walls 16, and a bottom wall 17. A raised central portion 18 in hopper 12 is provided between side walls 16 to define a left area 20a and a right area 20b having discharge openings 21a and 21b, respectively, along bottom wall 17 of the hopper. For example, openings 21a and 21b may each be triangular in cross-section through bottom wall 17. Such raised central portion 18 is formed along bottom wall 17 extends from back wall 14 upwards to an angled portion 22 of bottom wall 17 that extends upwards to meet along the base of front wall 15. A pair of curved portions 23 are provided along bottom wall 17 on either side of angled portion 22 and extending to each of side walls 16. Such curved portion 23 follow part of the curvature of wheels 24 when disposed below hopper 12 as shown in the FIGS. 1, 4, 8, and 9. Hopper 12 may be made of stainless steel or molded plastic material.

A lower frame 28 has a front portion 29a angled to conform to the exterior surface of angled portion 22 of hopper 12, and a rear portion 29b that extend under raised central portion 18 of hopper 12 to below the rear of hopper 12. Front and rear portions 29a and 29b may be formed from two separate frame members that are joined, such as bolted by bolt and nuts 28f (FIG. 4) in holes of front and rear portions 29a and 29b, to form frame 28. Front portion 29a of frame 28 is attached to hopper 12 along the exterior surface of angled portion 22 of bottom wall 17 by screws 28a via holes 22a through bottom wall 17, and holes 28b through frame 28, to retaining nuts 28c, via washers if needed. Frame 28 has a left pair of downwardly extending legs (or flanges) 30a each with a hole 32a at the lower end thereof, and a right pair of downwardly extending legs (or flanges) 30b each with a hole 32b at the lower end thereof. Left and a right drive shafts (or axles) 34a and 34b each have a proximal end 36 and a distal end 38. Drive shafts 34a and 34b are mounted to extend through holes 32a and 32b, respectively, via a roller bearing assembly 39 mounted in each of such holes, as shown in FIGS. 2, 4, 6, and 7. Roller bearing assembly 39, for example, may be a two-bolt flange-mounted ball bearing Part No. 2431K71 available from McMaster-Carr Supply Company of Elmhurst, Ill., but other roller bearing assemblies may be similarly used. Each roller bearing assembly 39 has a rotatable portion 39a that rotates upon bearings along a fixed portion 39b have a flange 39c retained to leg 30a or 30b by two bolts 39d and nuts 39e via holes in such flange and holes 33 (FIG. 2) along the leg. Rotatable portion 39a has a hole 39f which receives drive shaft 34a or 34b, and then a set screw 39g in such rotatable portion 39a is turned to fix the rotatable portion to the particular drive shaft being extended there through, so that the rotatable portion and drive shaft can rotate together. For purposes of illustration, the components of only two of roller bearings assemblies 39 are denoted by reference numerals, one for each of legs 30a and 30b are shown in FIG. 4. Drive shafts 34*a* and 34*b* are mounted in holes 32*a* and 32*b*, respectively, for rotation in their respective roller bearing assemblies 39, such that the proximal ends 36 of drive shafts 34*a* and 34*b* face each other and their distal ends 38 face away from each other.

Left and right wheels 24 each have a hub 25 with a central hole 26 (FIG. 2) into which is received distal end 38 of left and right drive shafts 34*a* and 34*b*, respectively, such that a hole 35 through each of shafts 34*a* and 34*b* aligns with a hole 27*b* in the hub 25 of their respective wheel 24. For each left and right drive shafts 34*a* and 34, a bolt 27*a* passes through hole 27*b* of the wheel 24 receiving the drive shaft, via hole 35 of the drive shaft, to a retaining nut 27*c*, such that the drive shafts and their wheels can rotate together. While hole 27*a* is along the interior portion of hub 25, optionally a hole may be provided through outer portion of hub 25 of each wheel 24 so that a cotter pin can be extended via a hole (if present) near the distal end 38 of each drive shaft 34*a* and 34*b* to retain each wheel 24 upon its associated drive shaft. A cross-member or spacer 31 may be provided across the interior one of legs 32*a* and 32*b* along the front of lower frame 28 for structural support.

Figure 2:
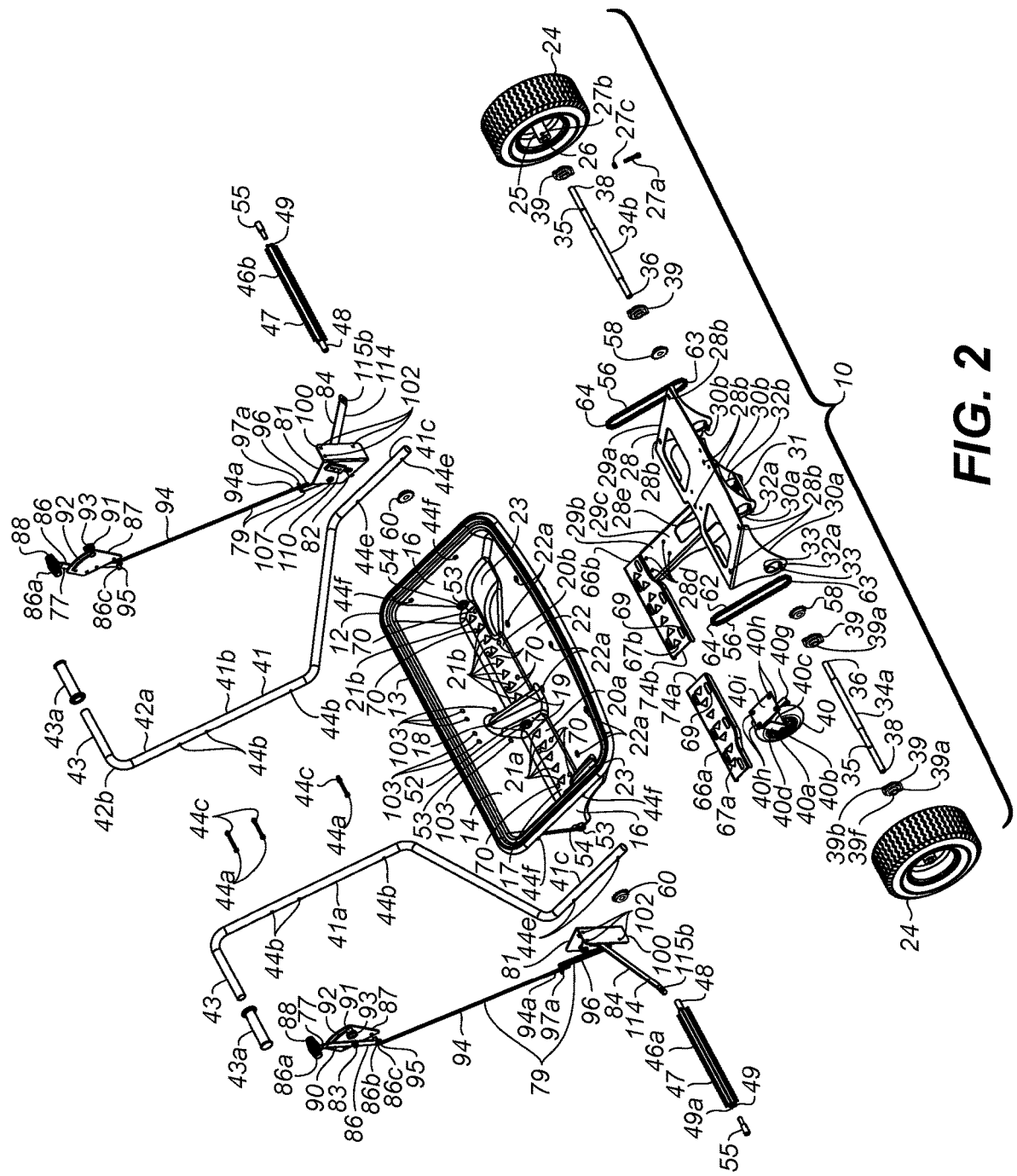
FIG. 2 is an exploded view of the spreader of FIG. 1, where elements for attaching components, such as nuts, bolts, and washers, are removed for purposes of illustration.
Figure 3:
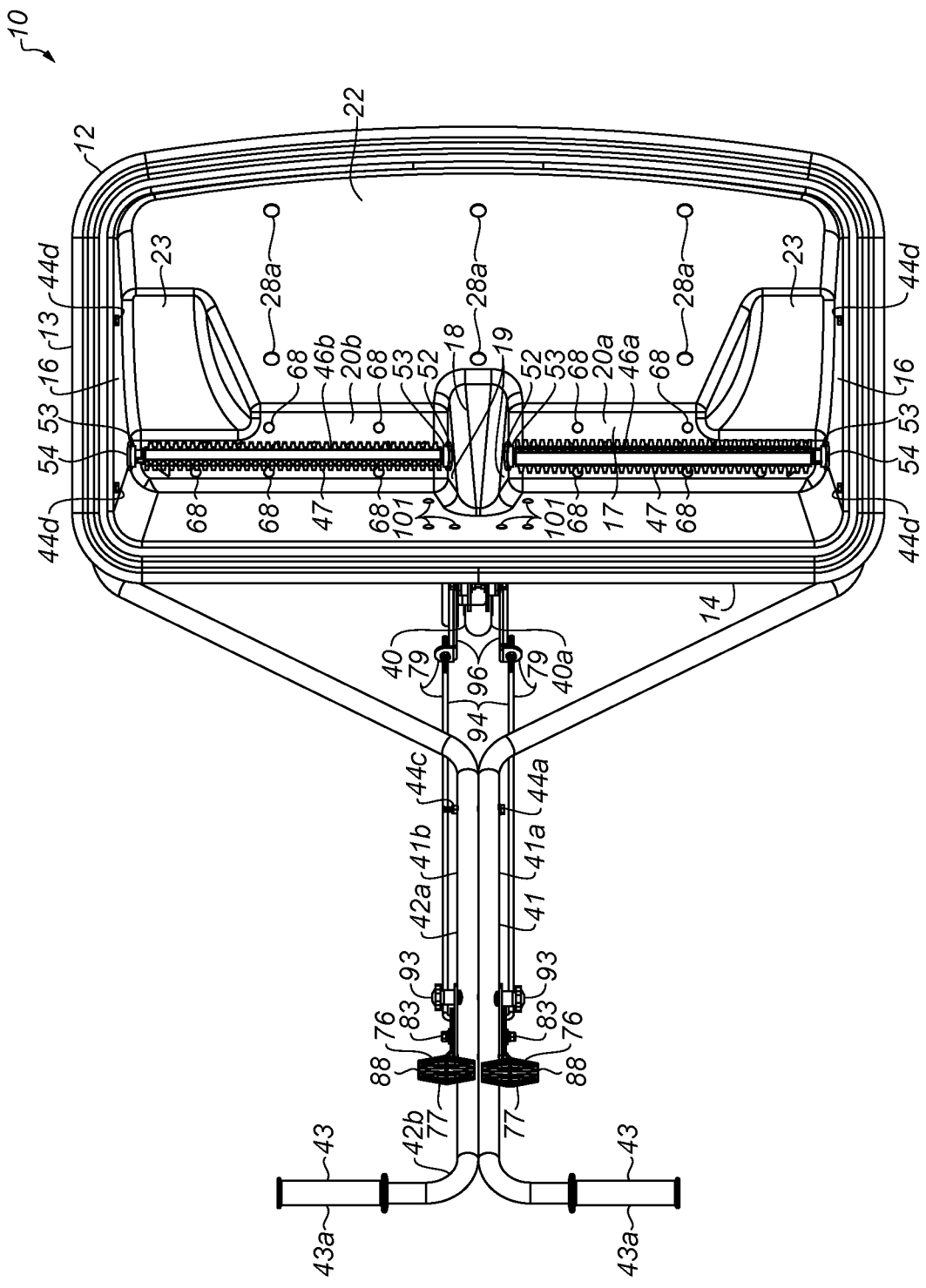
FIG. 3 is a top view of the spreader of FIG. 1.
Figure 11:
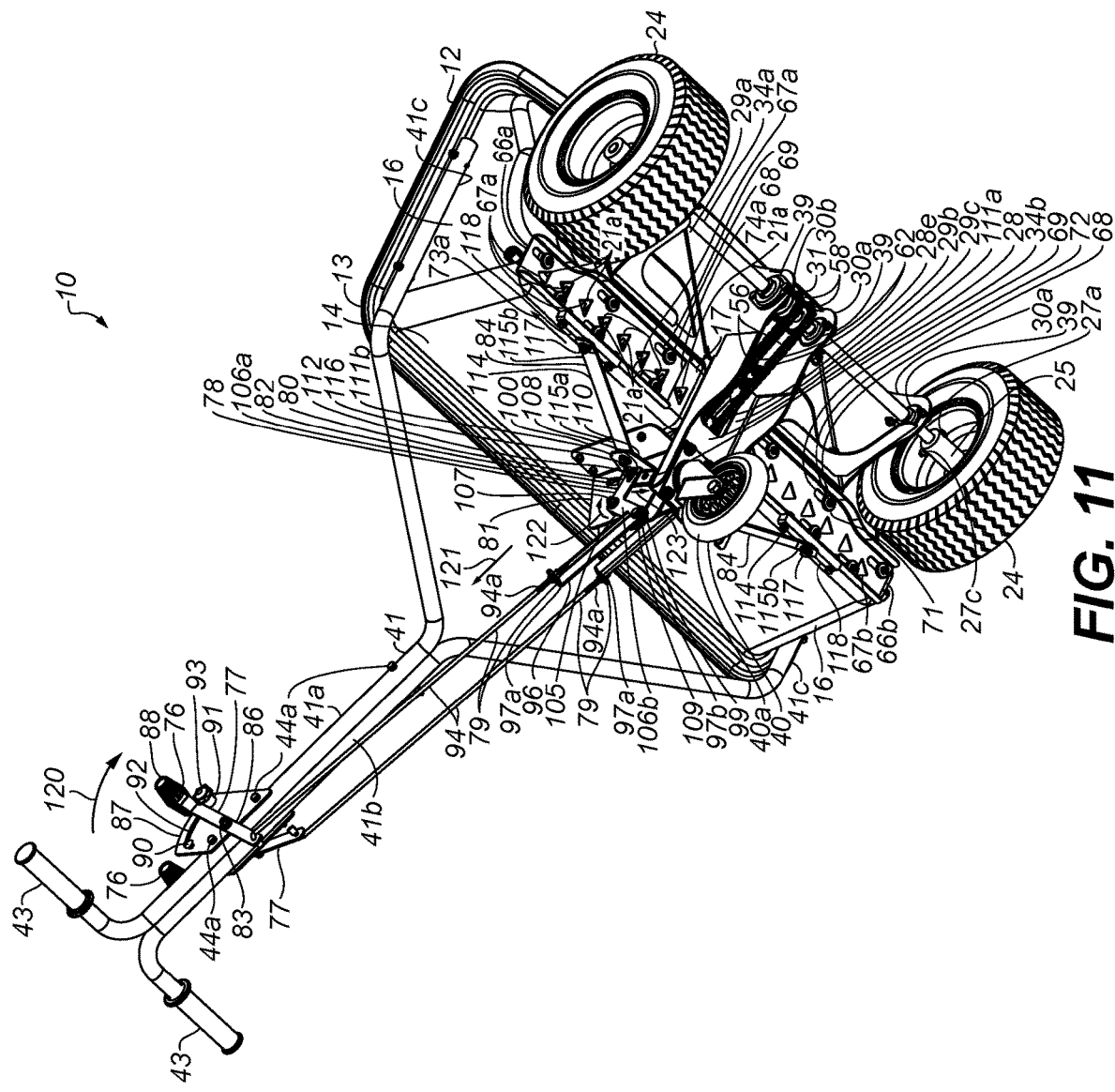
FIG. 11 is a perspective view of the drop spreader of FIG. 1 taken from the bottom thereof in the example of FIG. 10, where the right gate in a closed position and the left gate in an open position.

A caster 40 is mounted to the rear portion 29*b* of frame 28. Rear portion 29*b* has an upper wall 29*c* supported by the rearward extension of portions of two legs of front portion 29*a*, i.e., inner ones of legs 30*a* and legs 30*b*, as best shown in FIGS. 2 and 11. The caster 40 may have a wheel 40*a* mounted for rotation on a shaft 40*b* journaled between a pair of flanges 40*c* that extend from an angled shaft 40*d* having an upper end that rotates in a mounting fixture 40*i* attached to back end of rear portion 29*b* of frame 28. Mounting fixture 40*i* may be attached by screws 40*e* via holes 40*h* in mounting fixture 40*i* and holes 28*d* in upper wall 29*c* of lower frame 28 to retaining nuts 40*f*, via washers if needed. The shaft 40*d* can rotate with respect to mounting fixture 40*i* attached under upper wall 29*c* so that wheel 40*a* coupled to shaft 40*d*, via flanges 40*c* and shaft 40*b* is rotatable 360 degrees about rear portion 29*b* of frame 28. Thus, wheel 40*a* is referred to herein as rear wheel 40*a* of the spreader 10, and wheels 24 are referred to herein as front wheels 24 of spreader 10. Caster 40 may of steel, but preferably is of stainless steel, with a rubber or plastic wheel 40*a*. For example, caster 40 may be a Part No. 4941T14 available from McMaster-Carr Supply Company of Elmhurst, Ill., but other casters may be similarly used. The weight of the spreader 10 (and particulate material if present in hopper 12) is thus distributed upon rear wheel 40*a* and front wheels 24 to assist an operator in pushing (or pulling) spreader 10 along a surface 45, as described further below. Caster 40 serves the function of rear support member upon surface 45 for hopper 12, providing one of three points of contact with front wheels 24. Caster 40 may have an optional wheel brake 40*g* if the operator desires to lock the wheel 40*a* from rotating, as typical of a caster, as may be desirable for storage or transport of the spreader, or whenever rotation of wheel 40*a* is undesired.

The mounted wheels 24 on drive shafts 34*a* and 34*b* are each independently rotatable along frame 28 when rotated in their respective roller bearing assemblies 39 mounted in holes 32*a* and 32*b*, and outer surface of such wheels 24 have clearance for rotation with respect to hopper 12 due to curved portions 23 of bottom wall 17. The wheels 24 are positioned under hopper 12, where part of wheels 24 may extend under overhanging edge 13*a* of the top end 15 of hopper 12. In this manner, the overall width dimension 11 of the spreader 10 along its hopper 12 extends at or beyond a width of wheels 24 (denoted as 11*a* for one of wheels 24) that lies parallel to their drive shafts, as best shown in FIG. 4.

Spreader 10 has a rear frame 41 extending from hopper 12 to provide a pair of handles 43 for pushing the spreader 10 along surface 45 below the spreader with rotation of at least wheels 24. In the preferred embodiment, rear frame 41 has two tubular shafts 41*a* and 41*b*, which are coupled to each along an angled straight portion 42*a* of frame 41 and then extend forward to form a Y shape which bends to provide two parallel legs 41*c* that attach along the exterior of side walls 16 of hopper 12 just below overhanging edge 13*a* of hopper 12. The rear frame 41 tubular shafts 41*a* and 41*b* at the upper end of angled straight portion 42*a* are bent in opposing directions to form handle portion 42*b* having two handles 43 along which are received handle grips 43*a*. Two tubular shafts 41*a* and 41*b* are coupled to each other along their angled straight portions 42*a* by screws 44*a* received in holes 44*b* in tubular shafts 41*a* and 41*b* to retaining nuts 44*c*, via washers if needed. Legs 41*c* are attached to hopper 12 by screws 44*d* received in holes 44*e* in legs 41*c* and holes 44*f* in hopper side walls 16, to retaining nuts 44*g*, via washers if needed. Tubular shafts 41*a* and 41*b* may be made of stainless steel material, but other rigid material may similarly be used.

Spreader 10 may be moved along surface 45 in first and second modes. In the first mode, handles 43 are engaged and pushed by the operator to move the spreader 10 upon front wheels 24 and rear wheel 40*a* along a surface 45, as shown for example in FIG. 8. Such use in the first mode is facilitated by having the hopper 12 tilted backwards slightly along an angle 45*a* with respect to horizontal when all wheels 24 and 40*a* are in contact with surface 45 (depicted as being level or horizontal). For example, angle 45*a* may be 5 degrees. In the second mode, handles 43 are similarly engaged and pushed as in the first mode, but the operator also lifts the handles 43 to raise the rear frame 41 thereby raising rear wheel 40*a* a distance 45*b* from surface 45, as shown for example in FIG. 9. The distance 45*b* preferably substantially horizontally levels the top end 13 of hopper 12 along surface 45, but such distance is selected by the desired height the operator wishes to raise rear frame 41 above surface 45. Thus, in the second mode, only front wheels 24 are used to move the spreader 12 along surface 45, with the rear wheel lifted from having contact with surface 45.

One benefit in operating spreader 10 in the first mode, in addition to not requiring operator's physical effort in lifting rear frame 41 (and hence a portion of the spreader's weight and any particulate material present in hopper 12), is the slope of angled bottom wall 22 is greater than in second mode operation, which further promotes desired flow of that particulate material when present along angled bottom wall 22 within hopper 22 towards openings 21*a* and 21*b*. When front wheels 24 are moved along surface 45, wheel brake 40*g* of caster 40 is turned to an unlock position to allow free rotation of rear wheel 40*a*. The operator may optionally lock wheel 40*a* if desired in the second mode by turning wheel brake 40*g* to a locked position, so that wheel 40*a* will only serve the function of rear support member upon surface 45 for hopper 12. However such is not preferred, so that the operator can select between second and first modes as desired as the spreader become lighter in weight of spreader as particular material is dropped from hopper 12 onto surface 45 via one or both openings 21*a* and 21*b* when open.

Left and right rotational shafts 46*a* and 46*b* for particulate agitator elements (or members) 47 are rotationally mounted to extend across left and right areas 20*a* and 20*b* of hopper 12. Each of shafts 46a and 46b has a proximal end 48 which extends through a bushing 53 mounted in a hole 52 in one of two opposing side walls 19 of raised central portion 18 of hopper 12, and a distal end 49 which extends through another one of bushing 53 mounted in a hole 54 in one of opposing side walls 16 of hopper 12. To mount distal end 49 of each shaft 46a and 46b for rotation in its associated hole 54, the distal end 49 has a threaded central hole 49a for engaging a screw 55 received via hole 54 to engage hole 49a, in which the head of the screw 55 provides a cylindrical surface which rotates in the bushing 53 mounted in hole 54. Thus, screws 55 when engaged with shafts 46a and 46b effectively extend their distal ends 49 with respect to holes 54. Bushings 53 may be made of low friction plastic material, such as Delrin®, to provide a bearing surface within which rotates ends 48 and 49 of shafts 46a and 46b, which may be made of steel. Proximal ends 48 of shafts 46a and 46b extends into a cavity 50 within central raised portion 18 between side walls 19, such that proximal ends 48 of shafts 46a and 46b are disposed to face each other. The bottom end of central raised portion 18 below hopper 12 opens to cavity 50, while upper end of cavity 50 is closed by side walls 19 being contoured or inwardly angled as they extend upwards to a closed top end of raised central portion 18.

A pair of drive systems 56 are provided for independently rotating left and right shafts 46a and 46b by rotation of their associated left and right wheels 24. The left one of drive systems 56 comprises a lower gear or sprocket 58 fixed to proximal end 36 of left drive shaft 34a, an upper gear or sprocket 60 fixed to proximal end 48 of left shaft 46a that extends into cavity 50 of raised central portion 18 of hopper 12, and a drive chain 62 having one end 63 that engages (or meshes with) teeth of gear 58 and another end 64 that engages (or meshes with) teeth of gear 60. Rotation of gear 58 by rotation of left drive shaft 34a with rotation of a left one of wheels 24 transfers such rotation of gear 58 to gear 60, via drive chain 62, and thereby rotates shaft 46a and its agitator elements 47 over area 20a of hopper 12. Similarly, the right one of drive systems 56 comprises another one of lower gear 58 fixed to proximal end 36 of right drive shaft 34b, another one of upper gear 60 fixed to proximal end 48 of right shaft 46b that extend into cavity 50 of raised central portion 18 of hopper 12, and another one of drive chain 62 having one end 63 that engages teeth of gear 58 and a second end 64 that engages teeth of gear 60 such that rotation of gear 58 by rotation of right drive shaft 34b with rotation of a right one of wheels 24 transfers such rotation of gear 58 to gear 60, via drive chain 62, and thereby rotates shaft 46b and its agitator elements 47 over area 20b of hopper 12. Frame 28 has a slot 28e for passage of drive chains 62 of drive systems 56 between gears 58 and 60. Along the length of each shafts 46a and 46b which extend within hopper 12 are four rows of radial spaced extending members providing agitator elements 47 which rotate with rotation of their respective shafts to break up any clumps of particulate material in hopper 12 to promote their flow through openings 21a or 21b, respectively, when open.

Figure 4B:
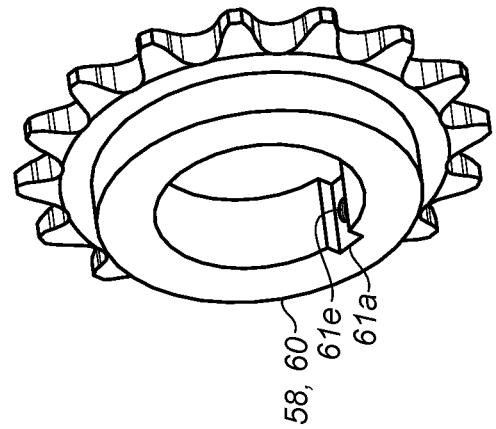
FIG. 4B is a perspective view of one of the gears of the drive systems of FIG. 4A.
Figure 4A:
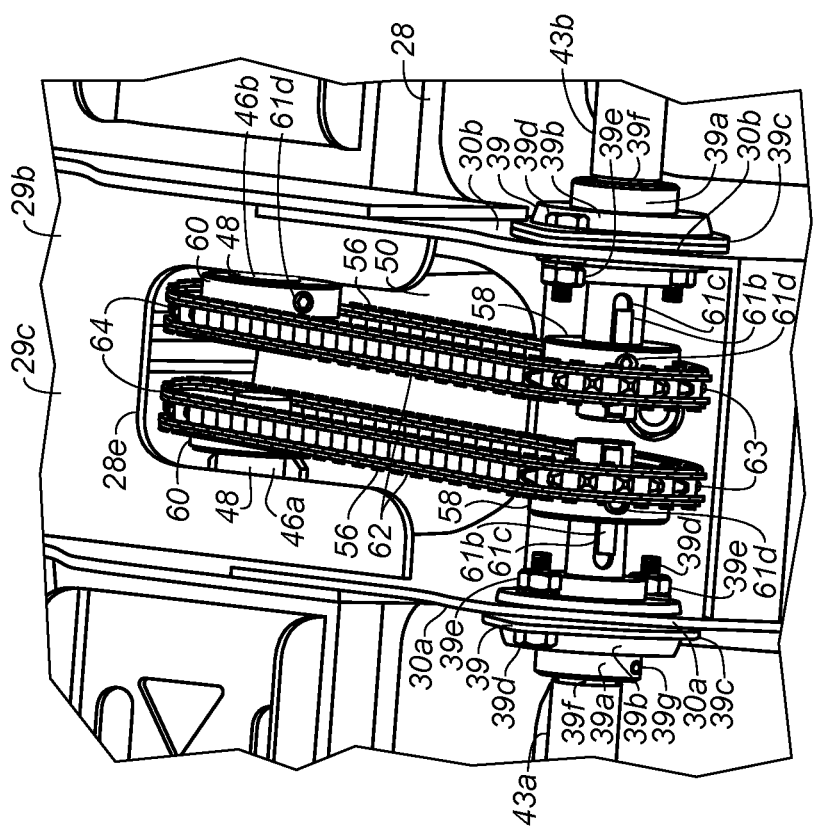
FIG. 4A is a broken perspective bottom view of the drive systems rotationally coupling the wheel axles of the spreader to rotate agitator shafts in the hopper of FIG. 1.

Referring to FIG. 4A, the mechanism for preferably fixing each gear 58 and 60 in position with their associated drive chains 62 is shown in more detail. Gears 58 and 60 each have a slot 61a (shown in FIG. 4B for one of gears 58 and 60) which engages and aligns with a key element 61b disposed is a longitudinal recessed slot 61c along each of the proximal ends 36 of shafts 34a, 34b, and proximal ends 48 of shafts 46a and 46b, so that a set screw 61d extended via a treaded hole 61e in the gear to slot 61 engages against key element 61b, thereby fixing the gear at a desired position along longitudinal slot 61c. For purposes of illustration, not all key element 61b, slot 61c, set screws 61d used with gears 58 and 60 are shown in FIG. 4A. Other mechanisms for fixing gears 58 and 60 in position on their respective shafts may be used.

Figure 6:
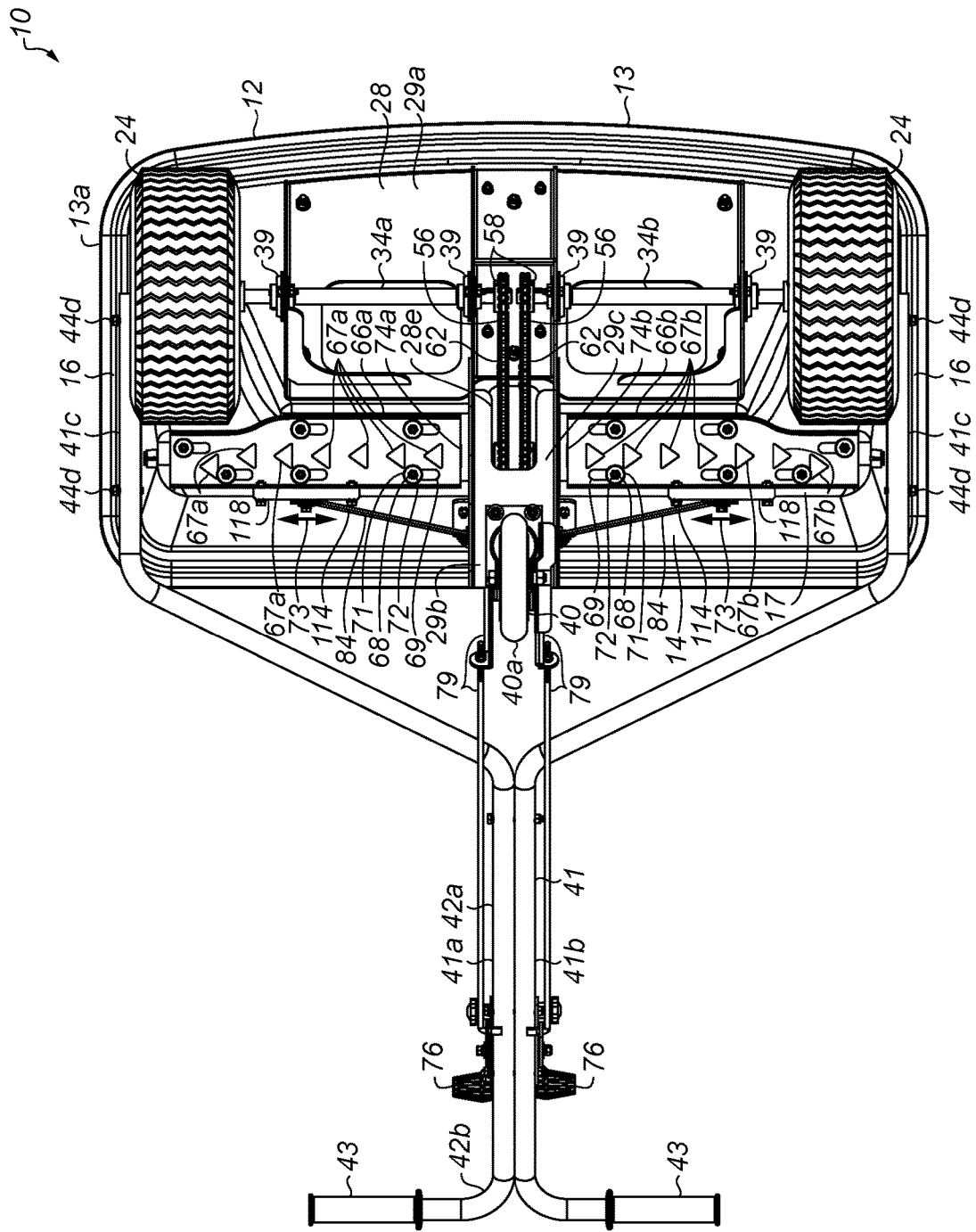
FIG. 6 is a bottom view of the spreader of FIG. 1.
Figure 7:
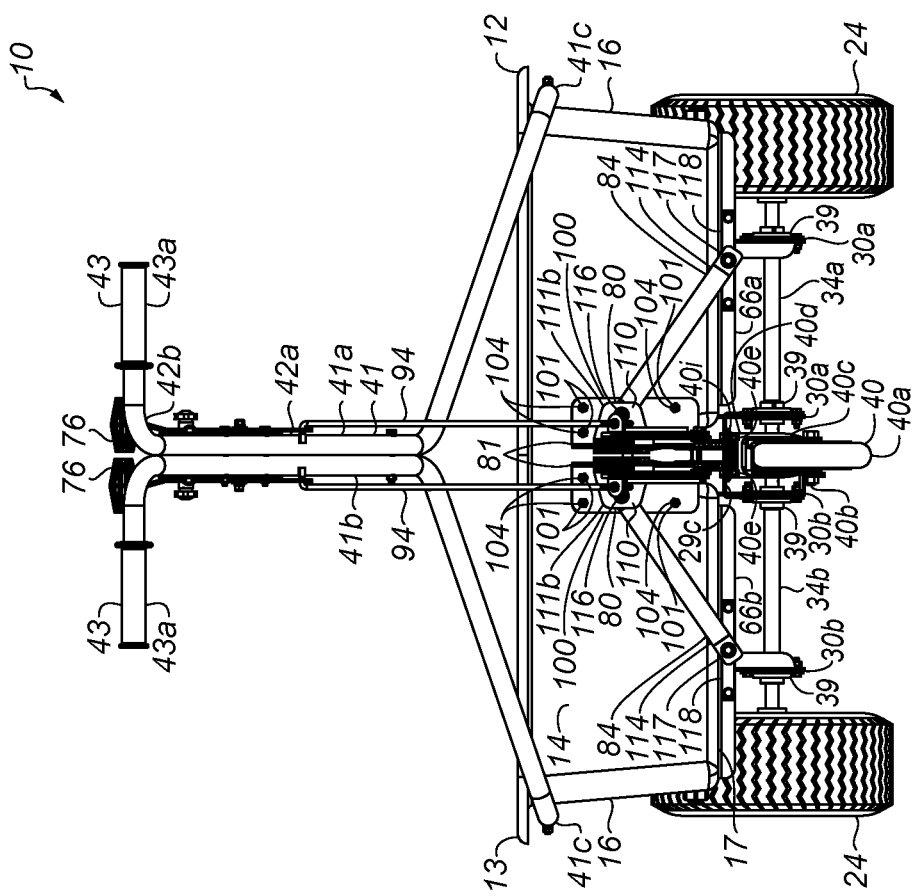
FIG. 7 is a back view of the spreader of FIG. 1.
Figure 8:
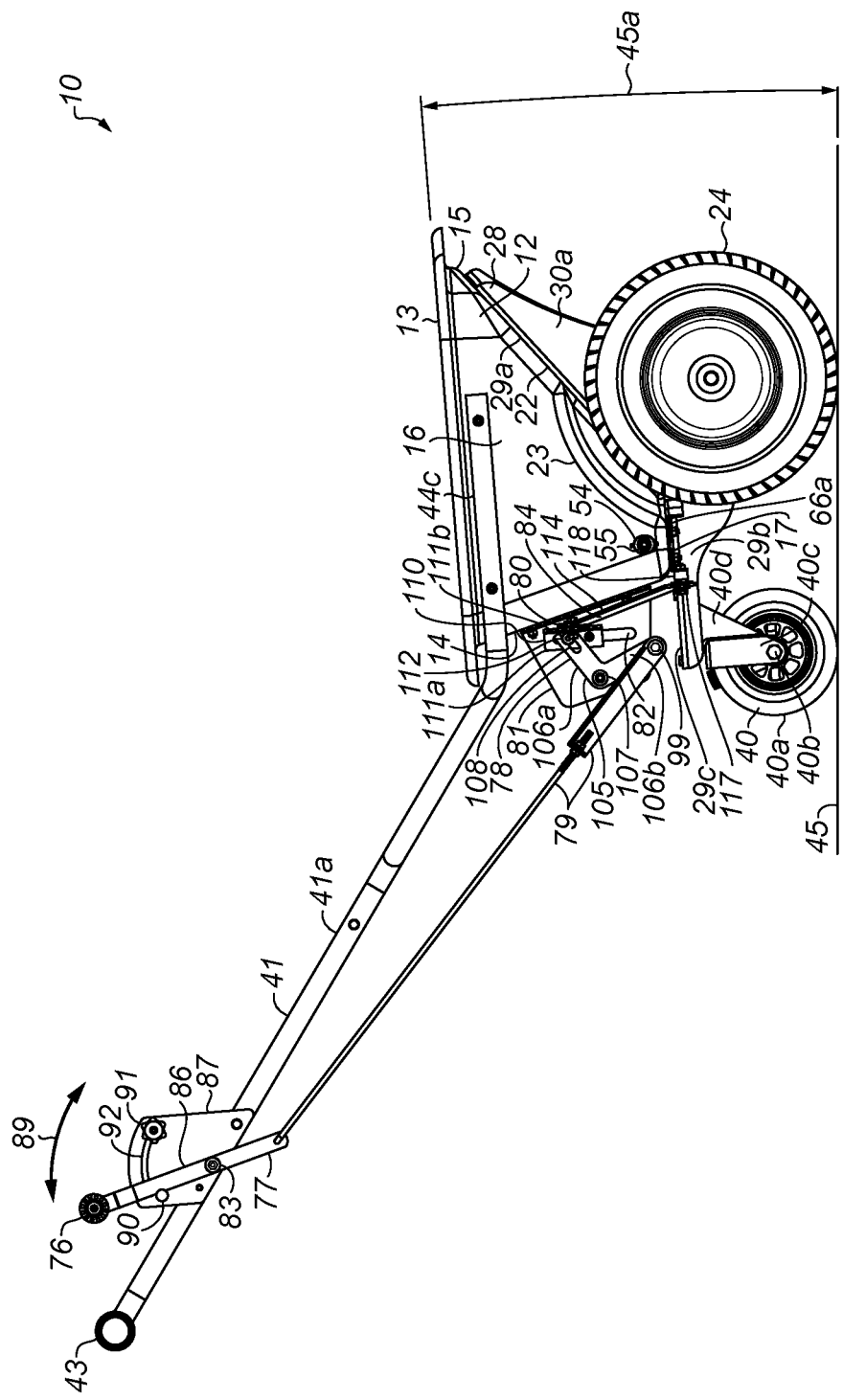
FIG. 8 is a left side view of the spreader of FIG. 1 depicting the example where the rear wheel and both front wheels of the spreader of FIG. 1 are disposed upon a generally even surface to provide the hopper of the spreader with a backward tilt.
Figure 9:
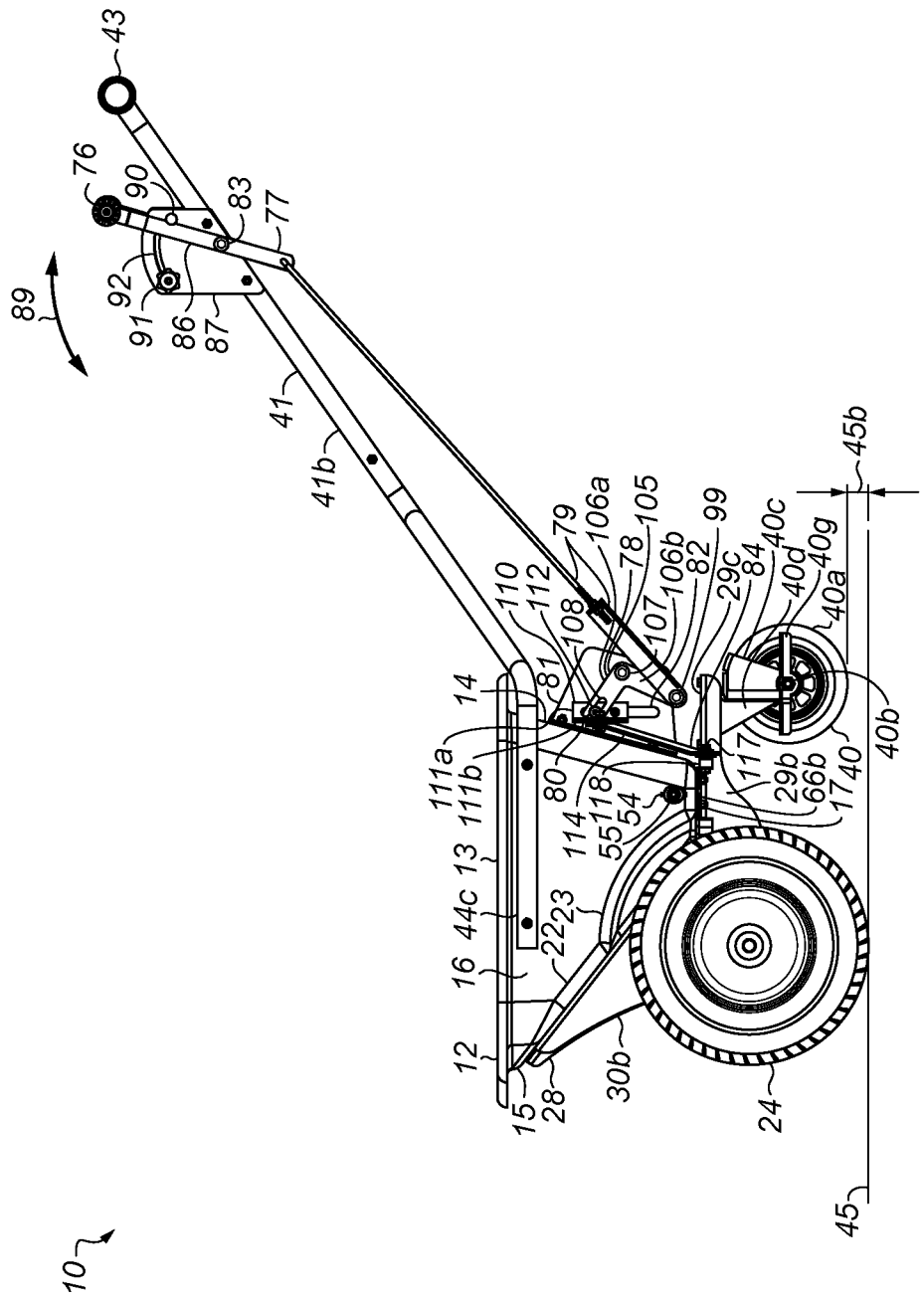
FIG. 9 is a right side view of the spreader of FIG. 1.

In FIG. 6, left and right gates 66a and 66b are shown each have openings 67a and 67b, respectively, provided below hopper 12 along bottom surface 17. Gates 66a and 66b are each independently moveable along a dimension parallel to the width of spreader 10 (as indicated by arrows 73) between closed and open positions with respect to openings 21a and 21b, respectively, of hopper 12, as described below. Such width dimension 11 being also parallel to the rotational axes along which shafts 34a, 34b, 46a and 46b rotate that extend longitudinally through such shafts. Openings 67a and 67b may be dimensionally the same as openings 21a and 21b. Although openings 67a, 67b, 21a, and 21b are triangular, other shapes may be used, such as to provide rectangular slots. Each gate 66a and 66b has six slots 69 that can ride or slide along six bolts 68 which extend through slots 69 of the gate after passing downward through holes 70 (FIG. 2) in bottom wall 17 of hopper 12, via washers 71, to nuts 72. Each nut 72 engages to retain its respective bolt 68 in slot 69, while providing a gap or space between the washer 71 and exterior surface of bottom wall 17 of hopper 12 such that each gate 66a and 66b can travel along its respective bolts 68 in slots 69 in the direction of arrows 73. An optional spacing element may be provided along the shaft of each bolt 68 when extended through their associated slot 69. For purposes of illustration only one of the six slots 69 and bolts 68, and their respective washers 71 and nuts 72, are referenced by their respective numerals in FIG. 6.

To enable the operator to independently position the left and right gates 66a and 66b between their open and closed positions (as well as partially open positions), a pair of left and right gate control systems 76 are each separately mechanically linked to left and right gates 66a and 66b, as described below. Each gate control system 76 has a first pivotal member 77 mounted near handles 43, a second pivotal member 78 mounted to a vertical plate 81 extending from back wall 14 of hopper 12, and a linking member 79 connecting the first pivotal member 77 and second pivotal member 78, so that the pivoting of first pivotal member 77 causes second pivotal member 78 to move a slide member 80 along a slot 82 on vertical plate 81. An arm member 84 extends along a downward angle from slide member 80 and one of gates 66a and 66b being controlled by the gate control system 76. As slide member 80 moves downward in slot 82, arm member 84 applies a force moving the gate coupled thereto outwards towards an open position, and as slide member 80 moves upwards in slot 82, arm member 84 applies a force in the reverse direction moving the gate coupled thereto inwards towards a closed position.

Figure 10:
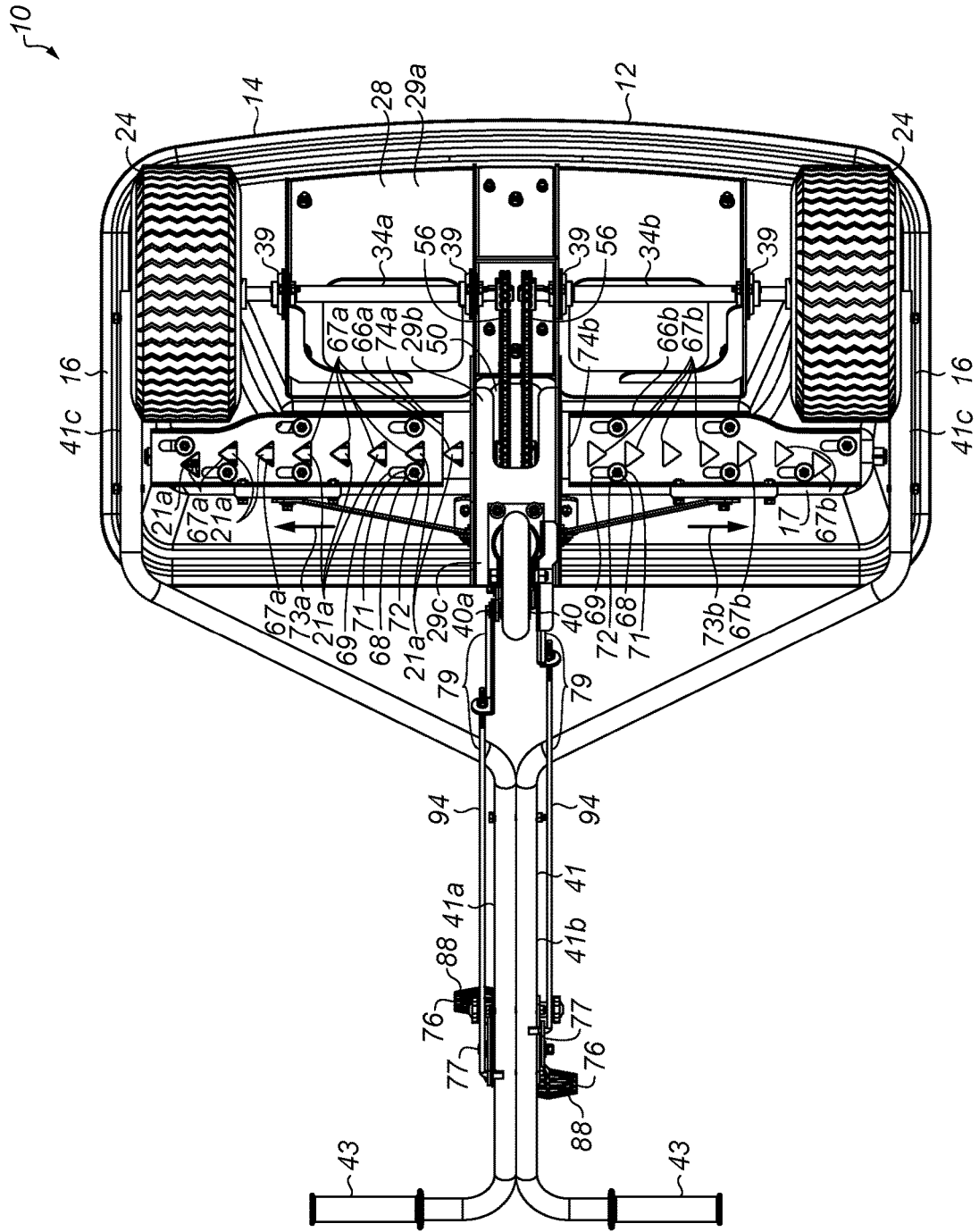
FIG. 10 is a bottom view of the spreader of FIG. 1 showing an example of the right gate in a closed position and the left gate in an open position and associated positions of controllers for such gates.

The gate control systems 76 of spreader 10 shows gates 66a and 66b in their closed positions in FIGS. 1 and 3-9 to block flow of any particulate material when present in hopper 12 through their respective openings 21a and 21b along bottom wall 17 of the hopper. FIGS. 10 and 11 shows an example of left gate 66a moved as indicated by arrow 73a to a full open position so that the seven of openings 67a of gate 66a align below to overlap seven of the eight openings 21a of hopper 12 with a proximal end 74a of the gate 66a moved to fully expose an innermost eighth one of openings 21a. While right gate 66b is shown in a fully closed position, where openings 21b of hopper 12 are fully blocked by the flat upper surface of gate 66b, gate 66b may similarly move in the direction of arrow 73b to an opening position with respect to openings 21b of hopper 12. For purposes of illustration only one of the six slots 69 and bolts 68, and their respective washers 71 and nuts 72, are referenced by their respective numerals in FIGS. 10 and 11.

In the preferred embodiment, first pivotal member 77 of each gate control system 76 is provided by a controller or control lever 86 pivotally mounted along a plate 87 attached to frame 41 for rotation about a bolt 83 through a hole in such plate 87 to a retaining nut, via a washer if needed. Control lever 86 and plate 87 of each of the gate control systems 76 mirror each other along opposing sides of tubular shafts 41a and 41b along straight portion 42a of frame 41. Plates 87 are attached by upper two ones of screws 44a and nuts 44c using holes 44b in shafts 41a and 41b. The uppermost end 86a of control lever 86 is a knob 88 that pivots along arrow 89 between a rearmost position defined by stop 90 and a forward most positon defined by stop 91. When pivoted to stop 90 and stop 91, the one of gates 66a or 66b coupled to control lever 86 is in its full close or full open position, respectively, while positioning control lever 86 between stops 90 and 91 enables the operator to select different partial open positions between full closed and full open as desired to select the desired flow rate of dropping particulate materials from hopper 12 for one of gates 66a or 66b coupled to lever 76 via gate openings 67a or 67b, and openings 21a or 21b, respectively, of hopper 12. Stop 90 is a button or raised post fixed, such as bolted, in position along plate 87. Stop 91 is preferably provided by a thumbscrew 93 extending through an arcuate slot 92 in plate 87 that follows the axis of rotation of control lever 86 (along arrow 89) to enable the operator to set a desired maximum particulate flow rate for such gate 66a or 66b coupled to the control lever 86. For example, thumbscrew 93 may be turned in one direction to release its position held by a nut 93a (FIG. 1) in slot 92, slid along slot 92 to a new position at which thumbscrew 93 is turned in the reverse direction to releasably lock in nut 93a at its new position. Graduations or other indicators may be provided along plate 87 along slot 92 generally indicating to the operator the different positions of the gate 66a or 66b associated with the control lever 86.

The gate control system 76 will now further be described for left gate 66a, as best shown in the perspective view of FIG. 11 for the same example of FIG. 10. Linking member 79 has an upper straight rod 94 and a lower bracket 96 coupled to rod 94. Rod 94 has a bent upper end 95 captured in a hole 86b of a lower end 86c of control lever 86. Bracket 96 has a bent upper end 97a with a hole through which rod 94 extends to located two nuts 98 received along a threaded portion 94a of rod 94, such that one nut 98 is tightened above and the other nut 98 tightened below upper end 97a of bracket 96 for attaching bracket 96 and rod 94 together to assembly linking member 79.

Vertical plate 81 extends from a mounting plate 100 to the exterior back wall 14 of hopper 12. Mounting plate 100 is fixed to hopper 12 by three screws 101 that extend through holes 102 in mounting plate 100 and holes 103 (FIG. 2) in the back wall 14 of hopper 12 to retaining nuts 104 (FIG. 7), via washers if needed.

The second pivot member 78 is provided by a bracket 105 having a first portion 106a and a second portion 106b that are angled with respect to each other to form generally an L shape. Bracket 105 pivots about a bolt 107 that extends in a hole in vertical plate 81 to a nut, via a washer if needed. The lower end 109 of second portion 106b of bracket 105 is rotationally coupled to lower end 97b of bracket 96 of linking member 79, such as by a bolt 99 extending through holes in lower end 97b and lower end 109 to a nut, via a washer if needed.

Slide member 80 is provided by a bracket 110 with a first portion 111a having an extending post or shaft 112 received in slot 82, and a second portion 111b at a right angle with first portion 111a. Bracket 105 of the second pivot member 78 has a front slot 108 along its first portion 106a into which post 112 of slide member 80 is received, such that pivoting of second pivot member 78 about the pivot provided by bolt 107 moves bracket 110 up and down slot 82 along its post 112. Arm member 84 is provided by a shaft 114 having an upper end 115a mounted for rotation about a bolt 116 extending through holes in upper end 115a and second portion 111b of bracket 110 of slide member 80, such bolt 116 being retained by a nut while enabling such rotation, via a washer if needed. The lower end 115b of shaft 114 providing arm member 84 is mounted for rotation about a bolt 117 extending, via a hole in lower end 115b, from a bracket 118 bolted along one elongated extending side of left gates 66a. Thus, as bracket 110 of slide member 80 moves downward or upward riding along post 112 in slot 82, upper end 115a of bracket 110 pivots about bolt 116, causing lower end 115b to pivot about bolt 117 of bracket 118 while moving bracket 110 and its left gate 66a outward or inward, respectively, along bolts 68 in slots 69 of left gate 66a.

The gate control systems 76 for controlling the left gate 66a and right gate 66b are the same, but mirror each other along spreader 10, and accordingly use the same reference numerals. Thus, a separate discussion of the operation of right gate 66b is not provided. As gate control systems 76 mirror each other, right gate 66b when moved to an open position moves outward, as indicated by arrow 73b (FIG. 10), in the opposite direction of left gate 66a when moved to an open position, as indicated by arrow 73a, and right gate 66b likewise moves inward in the opposite direction of left gate 66a to a closed position.

In the example for operating gate control system 76 of left gate 66a shown in FIGS. 10 and 11, pivoting first pivot member 77, i.e., control lever 86, in the direction of arrow 120 against stop 91 of thumbscrew 93, moves linking member 79 upwards in the direction of arrow 121, which pivots second pivot member 78 in the direction of arrow 122 to move slide member 80 downwards along slot 82 in the direction of arrow 123, thereby moving the lower end 115b of arm member 84 and left gate 66a coupled thereto outwards in direction of arrow 73a to its open position illustrated. Moving first pivot member 77 in the reverse direction of motion of arrow 116, thus will move left gate 66a in the reverse direction back to a full close position. The gate control system 76 for the right gate 66b may be similarly operated independent of the gate control system 76 for the left gate 66a.

As stated earlier, the operator can use each control lever 86 to select different partial open positions between full closed and full open as desired to select the desired flow rate of dropping particulate materials from hopper 12 for one of gates 66a or 66b coupled to lever 86 via gate openings 67a or 67b, and hopper openings 21a or 21b, respectively. Thus, as each control levers 86 is manually pivoted forward to move its mechanically linked gate 66a or 66b from full closed to partial open to then full open positions by movements in the direction of arrows 73a or 73b, respectively, the openings 67a and 67b, respectively, increase from zero in the amount of their overlap of seven of openings 21a or 21b, respectively, while gate end 74a or 74b, respectively, increases from zero the amount of exposure of an innermost eighth one of openings 21a or 21b (i.e., closest to raised central portion 18), respectively, so that closed, partial open, to full open states of openings 21a or 21b, respectively, are selectable to set the flow rate of particulate material there through. For each control lever 86, stop 90 and adjustable stop 91, i.e., by thumbscrew 93, limit the range of its pivot so that the operator is assured that the lever when abutting stops 90 and 91 their mechanically linked gate 66a or 66b are fully closed position or at the operator selected open position as set by thumbscrew 93, respectively.

To calibrate each gate control system 76, the nuts 98 along rod 94 may be used for adjusting the length of linking member 79 between first pivot member 77 and second pivot members 78, thereby controlling the extent of pivot of second pivot member 78 responsive to pivoting of control lever 86 of the first pivot member 77 and setting the range over which slide member 80 is positionable by the second pivot member 78 to effectively open and close gate 66a or 66b via arm member 84 coupled there between. The components of the gate control systems 76 may be made of stainless steel material, but other rigid material may similarly be used.

The advantage of having left and right independent gate control systems in spreader 10 is to enable an operator to drop particulate material from the hopper 12 in a more precise manner onto a surface by selecting either to drop particulate material substantially over the full extent of the width of the hopper by opening both gates 66a and 66b, or to less than the full extent of the hopper 12 by selecting to open only one of the gates 66a and 66b and not the other, so that only the left or right width halves of the spreader 10 associated with hopper areas 20a or 20b, respectively, are utilized.

In operation, when full coverage along the width dimension of particulate material from spreader 10 is desired, both gates 66a and 66b are placed in their open position by pivoting their respective coupled levers 86 each to stop 91, and the spreader 10 is pushed using handles 53 along its wheels 24, and optionally wheel 40a of caster 40 in first or second modes described earlier. Particulate material drops by gravity from hopper 12, via openings 21a, 21b, 67a, and 67b, onto such surface with assistance of motion of particulate material agitator elements 47 being rotated by shafts 46a and 46b that move indirectly in concert with the wheels 24 as described above. Agitator elements 47 assist in breaking up clumps that may occur in particulate material to minimize obstruction of one or more of discharge openings 21a and 21b. When less than full width dropping of particulate material is desired, one of left gate 66a or right gate 66b is opened and the other is closed by positioning one of the levers 86 associated with the gate to be opened to stop 91 and the other of the control lever 86 associated with the gate to be closed to stop 90.

In hopper 12 for example, the width between side walls 16 may be 33.31 inches at the height in the hopper along which shafts 46a and 46b extend, with the width between side walls 19 of the raised central portion 18 may be, for example, 2.9 inches. The overall width dimension 11 (FIG. 4) of hopper 12 may be, for example, 38.8 inches. With the hopper 12 horizontal, the height of the hopper along wheels 24 to top end 13 may be, for example, 18.68 inches, and height of the hopper to handles 43 may be, for example, 38.76, inches. However, other dimensions may be used. The height of raised central portion 18 in hopper 12 may be, for example, 4.27 inches from the interior bottom surface of bottom wall 17, while the entire height dimension of the hopper 12 from the interior bottom surface of bottom wall 17 to top end 13 may be, for example, 9.94 inches.

It has been found that since the openings 21a and 21b of the hopper 12 substantially extend over an entire width dimension 11 of spreader 10 along their respective separate different areas 20a and 20b, and the raised central portion 18 and overhang edge 13a are of such low factional portions of such width dimension, as evident in FIG. 6 for example, effective full coverage of particulate material via openings 21a an 21b is achieved when gates 66a and 66b are both in their open positions as the spreader is pushed along a surface.

From the foregoing description it will be apparent that there has been provided an improved drop spreader. Variations and modifications in the herein described drop spreader will undoubtedly suggest themselves to those skilled in the art. For example, less preferably a pair of legs can extend downward from rear frame 41, instead of caster 40 and rear portion 29b of frame 28, to support the rear of spreader 10 when resting on a surface. Accordingly, the above description should be taken as illustrative and not in a limiting sense.

The invention claimed is:

1. A spreader for dropping particulate material comprising:
  a hopper for particulate material having an open top end defined by a back wall, a front wall and two opposing side walls, and a bottom having a bottom wall and an angled portion, wherein said bottom wall defines openings therein, in which said openings are divided into two different areas by a raised central portion, each of said areas extends from said raised central portion to a respective opposing side wall of the hopper;
  a frame supporting said hopper;
  a pair of wheels mounted upon separate drive shafts, each of said drive shafts being mounted to said frame for rotating said wheels, wherein said bottom defines a pair of curved portions wherein each wheel is disposed under said hopper and received within a respective curved portion, and wherein a portion of said openings defined in said bottom wall of said hopper extends behind said curved portions;
  a pair of handles extending from said hopper for pushing said spreader along a surface below the spreader with rotation of said wheels;
  two gates with openings, said gates being mounted below said hopper for movement between a first position and a second position, in which each of said gates at said first position closes said openings along a different one of said two areas, and each of said gates at said second position the openings of the gate at least partially overlaps the openings along said bottom of said hopper which were closed at said first position by said gate so that particulate material when present in the hopper to fall there through onto the surface below the spreader; and
  a pair of controllers disposed near said handles each mechanically coupled to a different one of said two gates to independently move a different one of said gates between said first position and said second position.

2. The spreader according to claim 1 wherein each of said gates has an end, and the end of each of said gates at said second position at least partially exposes one of the openings which were closed at said first position by said gate.

3. The spreader according to claim 1 wherein each of said controllers are mounted along a frame coupling said hopper to said handles to pivot between the first position and the second position of one of the gates mechanically coupled to the controller.

4. The spreader according to claim 1 wherein each of said controllers are mounted along a frame coupling said hopper to said handles to pivot between two stops associated with the first position and second position of one of the gates mechanically coupled to the controller, and one of said stops associated with said second position of said one of the gates is adjustable in position to set a maximum flow rate through the openings of the gate at said second position.

5. The spreader according to claim 1 further comprising two rotatable shafts mounted in said hopper each over a different one of said two different areas and coupled for rotation to a different one of said two drive shafts, in which agitator elements for said particulate material are provided along said shafts mounted in said hopper.

6. The spreader according to claim 5 wherein each of said rotatable shafts has two ends, one of said ends being mounted for rotation along one of said two different opposing sides of the hopper and the other of said ends being mounted for rotation in said raised central portion and then extending into a cavity formed by said raised central portion under the bottom of the hopper for coupling by gears and a drive chain to said one of said two drive shafts.

7. The spreader according to claim 1 further comprising another wheel rotationally mounted to said frame rearward from said pair of wheels.

8. The spreader according to claim 7 wherein said another wheel is mounted to said frame and is configured to swivel 360 degrees.

9. The spreader according to claim 7 wherein said hopper is tilted backwards with respect to a horizontal with said another wheel and said pair of wheels being positioned on the surface.

10. The spreader according to claim 9 wherein said spreader is selectively operable in either a first mode or a second mode, said spreader when in said first mode is movable along said pair of wheels and said another wheel along the surface by being pushed manually using said handles, and said spreader when in said second mode is movable along said pair of wheels along the surface by being manually pushed and raised using said handles lifting said another wheel from contact with said surface.

11. The spreader according to claim 1 wherein said raised central portion is less than a height of the hopper between said bottom and a top end of said hopper.

* * * * *